(12) United States Patent
Peana et al.

(10) Patent No.: US 11,592,725 B2
(45) Date of Patent: Feb. 28, 2023

(54) SYSTEMS AND METHODS FOR OPERATING AN ELECTRO-OPTICAL SHUTTER WITH VARIABLE TRANSMISSIVITY

(71) Applicant: Dell Products, L.P., Round Rock, TX (US)

(72) Inventors: Stefan Peana, Austin, TX (US); Mitch Anthony Markow, Hutto, TX (US)

(73) Assignee: Dell Products, L.P., Round Rock, TX (US)

( * ) Notice: Subject to any disclaimer, the term of this patent is extended or adjusted under 35 U.S.C. 154(b) by 353 days.

(21) Appl. No.: 16/928,315

(22) Filed: Jul. 14, 2020

(65) Prior Publication Data

US 2022/0019126 A1  Jan. 20, 2022

(51) Int. Cl.
| | | |
|---|---|---|
| *G03B 9/08* | (2021.01) | |
| *H04N 5/235* | (2006.01) | |
| *H04N 21/478* | (2011.01) | |
| *H04N 21/462* | (2011.01) | |

(52) U.S. Cl.
CPC ............. *G03B 9/08* (2013.01); *H04N 5/2353* (2013.01); *H04N 21/4622* (2013.01); *H04N 21/478* (2013.01)

(58) Field of Classification Search
CPC .... G03B 9/08; H04N 5/2353; H04N 21/4622; H04N 21/478
See application file for complete search history.

(56) References Cited

U.S. PATENT DOCUMENTS

| | | | | |
|---|---|---|---|---|
| 2015/0163385 | A1* | 6/2015 | Haddad | G03B 11/043 348/374 |
| 2015/0288882 | A1* | 10/2015 | Haddad | H04N 5/2353 348/211.2 |
| 2020/0355979 | A1* | 11/2020 | Ladavac | G02F 1/16757 |
| 2021/0116771 | A1* | 4/2021 | Demuth | G02F 1/16757 |
| 2021/0200294 | A1* | 7/2021 | Tam | H04M 1/72463 |

* cited by examiner

*Primary Examiner* — Clayton E. LaBalle
*Assistant Examiner* — Diana Hancock
(74) *Attorney, Agent, or Firm* — Fogarty LLP

(57) ABSTRACT

Embodiments of systems and methods for operating an electro-optical shutter with variable transmissivity are described. In some embodiments, an Information Handling System (IHS) may include a processor and a memory coupled to the processor, the memory having program instructions stored thereon that, upon execution, cause the IHS to: receive context information, and control a transmissivity of the electro-optical shutter of a camera coupled to the IHS, at least in part, based upon the context information.

20 Claims, 4 Drawing Sheets

SYSTEMS AND METHODS FOR OPERATING AN ELECTRO-OPTICAL SHUTTER WITH VARIABLE TRANSMISSIVITY

FIELD

The present disclosure relates generally to Information Handling Systems (IHSs), and more particularly, to systems and methods for operating an electro-optical shutter with variable transmissivity.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS can execute many different types of applications, including certain applications that use and process images received from a camera, such as remote meetings, video conferencing, surveillance, monitoring, video capture and/or editing, etc. As the inventors hereof have recognized, however, cameras built into conventional IHSs use mechanical shutters that lack variable or controllable transmissivity characteristics.

SUMMARY

Embodiments of systems and methods for operating an electro-optical shutter with variable transmissivity are described. In an illustrative, non-limiting embodiment, an Information Handling System (IHS) may include a processor and a memory coupled to the processor, the memory having program instructions stored thereon that, upon execution, cause the IHS to: receive context information, and control a transmissivity of the electro-optical shutter of a camera coupled to the IHS, at least in part, based upon the context information.

The context information may include a privacy setting, and to control the transmissivity of the electro-optical shutter, the program instructions, upon execution, may cause the IHS to: (a) increase the transmissivity in response to the privacy setting having a first value, and (b) decrease the transmissivity in response to the privacy setting having a second value greater than the first value. To control the transmissivity of the electro-optical shutter, the program instructions, upon execution, may cause the IHS to: (a) increase the transmissivity until the IHS is capable of distinguishing visual features in an image captured by the camera, or (b) decrease the transmissivity until the IHS is no longer capable of distinguishing the visual features but is capable of identifying a user's presence or proximity to the IHS.

Additionally, or alternatively, the context information may include a user's proximity to the IHS, and to control the transmissivity of the electro-optical shutter, the program instructions, upon execution, may the IHS to: (a) increase the transmissivity to a first value in response to a user being in a far-field of the IHS, and (b) decrease the transmissivity to a second value in response to the user being in a near-field of the IHS. Additionally, or alternatively, the context information may include at least one of: an identity of a user of the IHS, a time-of-day, a calendar event, a type of calendar event, an application currently under execution, a duration of execution of an application, a mode of execution of an application, or a user's gaze direction.

The context information may include at least one of: a current location of the IHS, a current memory usage, a characteristic of a current network connection, a current power usage, an identification of a currently connected peripheral device, or a current IHS posture. The electro-optical shutter may be disposed on a bezel of a display coupled to the IHS. The electro-optical shutter may include a liquid crystal material disposed between at least two glass substrates, each glass substrate having a respective transparent electrode coupled thereto, and to control the transmissivity of the electro-optical shutter, the program instructions, upon execution, may cause the IHS to control a voltage applied to the liquid crystal material via the transparent electrode.

To control the voltage, the program instructions, upon execution, may cause the IHS to apply a voltage ladder to the liquid crystal material. The liquid crystal material may be selected based upon a color of the bezel. For example, the liquid crystal material may include at least one of: (a) a ferroelectrical material if the bezel is black, (b) a polymeric material if the bezel is white, or (c) a nematic or smectmatic material with color dye if the bezel is neither black nor white.

In another illustrative, non-limiting embodiment, a memory storage device may have program instructions stored thereon that, upon execution by one or more processors of an IHS, cause the IHS to: receive context information; and control a transmissivity of an electro-optical shutter of a camera coupled to the IHS, at least in part, based upon the context information. In yet another illustrative, non-limiting embodiment, a method may include receiving context information and controlling a transmissivity of an electro-optical shutter of a camera coupled to the IHS, at least in part, based upon the context information.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Systems and methods for operating an electro-optical shutter with variable transmissivity are described herein. In some embodiments, these systems and methods may include an electro-optical shutter suitable for narrow Information Handling System (IHS) bezels with various design shapes (e.g., square, round, octagonal, etc.) and/or pixel layouts. Those multiple design shapes and/or pixel layouts may be used to enable various shutter designs and activation times.

In various implementations, the electro-optical shutter's default state may be an "off-state," which is followed by an "on-state" when a user wants to turn on the camera. The electro-optical shutter's power consumption may be configured to be minimal when the shutter is in its on-state state (e.g., of the order of μV), thus consuming negligible amounts of power. Moreover, a voltage ladder may be used to control the shutter's activation time and/or to produce different, non-binary activation states such as: transparent, semi-transparent, and/or opaque. In some cases, different activation states may be automatically selected based upon context information (e.g., a privacy setting, a proximity of a user to the IHS, etc.), as described in more detail below.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
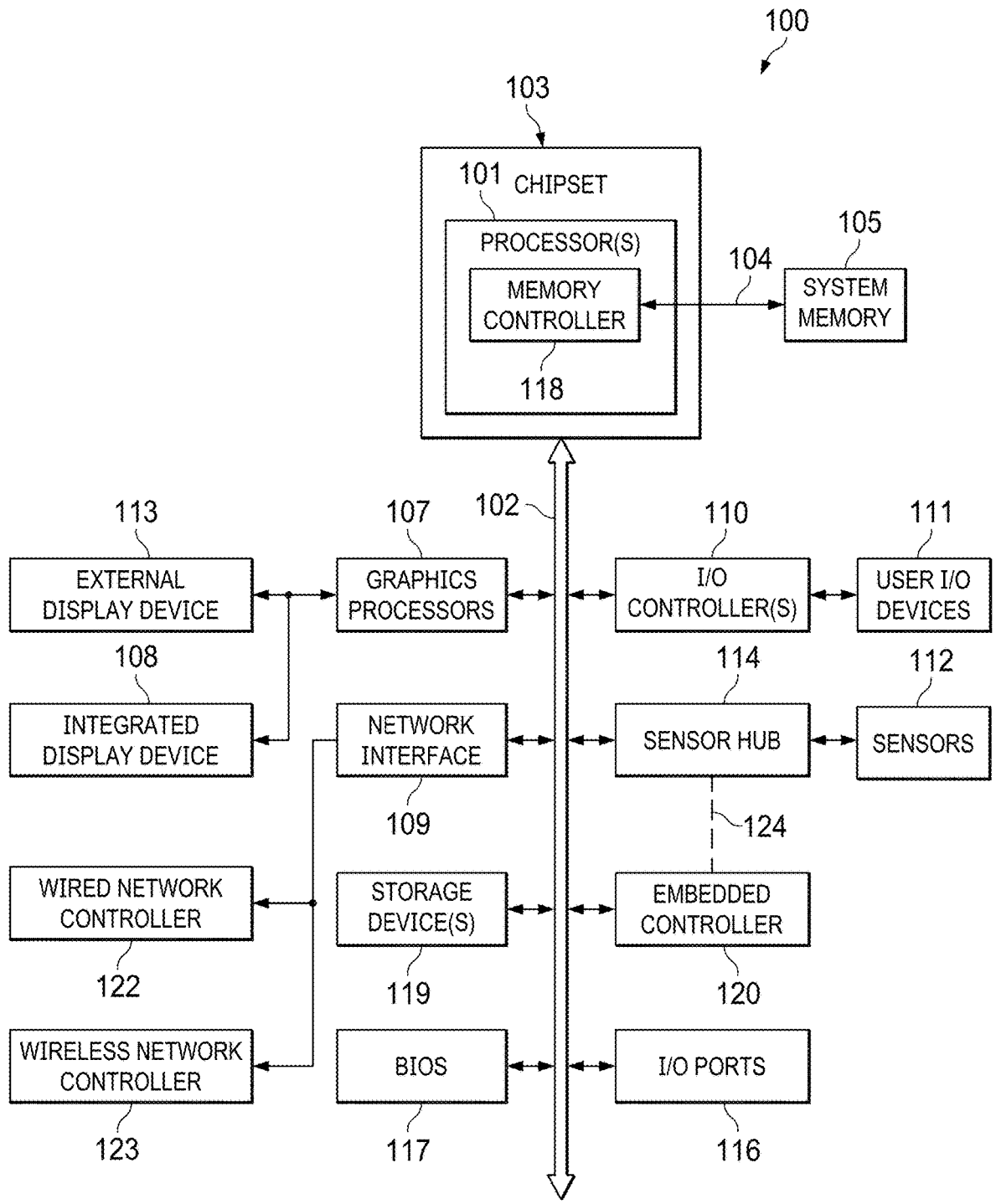
FIG. 1 is a block diagram of an example of an Information Handling System (IHS) configured to operate an electro-optical shutter with variable transmissivity, according to some embodiments.

FIG. 1 is a block diagram illustrating components of IHS 100 configured to operate an electro-optical shutter with variable transmissivity. As shown, IHS 100 includes one or more processors 101, such as a Central Processing Unit (CPU), that execute code retrieved from system memory 105. Although IHS 100 is illustrated with a single processor 101, other embodiments may include two or more processors, that may each be configured identically, or to provide specialized processing operations. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor 101 includes an integrated memory controller 118 that may be implemented directly within the circuitry of processor 101, or memory controller 118 may be a separate integrated circuit that is located on the same die as processor 101. Memory controller 118 may be configured to manage the transfer of data to and from the system memory 105 of IHS 100 via high-speed memory interface 104. System memory 105 that is coupled to processor 101 provides processor 101 with a high-speed memory that may be used in the execution of computer program instructions by processor 101.

Accordingly, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 may include multiple removable memory modules.

IHS 100 utilizes chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to I/O port 116 and/or peripheral components that are wirelessly coupled to IHS 100 via network interface 109. In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 that may support different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controllers 122 and wireless network controllers 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor 107. Graphics processor 107 may be included within a video card, graphics card or within an embedded controller installed within IHS 100. Additionally, or alternatively, graphics processor 107 may be integrated within processor 101, such as a component of a system-on-chip (SoC). Graphics processor 107 may generate display information and provide the generated information to one or more display device(s) 108 and/or 113, coupled to IHS 100.

One or more display devices 108 and/or 113 coupled to IHS 100 may utilize LCD, LED, OLED, or other display technologies. Each display device 108 and 113 may be capable of receiving touch inputs such as via a touch controller that may be an embedded component of the display device 108 and/or 113 or graphics processor 107, or it may be a separate component of IHS 100 accessed via bus 102. In some cases, power to graphics processor 107, integrated display device 108 and/or external display 133 may be turned off or configured to operate at minimal power levels in response to IHS 100 entering a low-power state (e.g., standby).

As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor 101 with access to one or more storage devices 119. In various embodiments, storage device 119 may be integral to IHS 100 or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. BIOS 117 instructions may also load an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 capable of sampling and/or collecting data from a variety of hardware sensors 112. In various implementations, sensors 112 may include a camera, as described in more detail in FIG. 2. More generally, however, sensors 112 may include, but are not limited to: electric, magnetic, hall effect, radio, optical, infrared, thermal, force, pressure, touch, acoustic, ultrasonic, proximity, position, location, angle, deformation, bending, direction, movement, velocity, rotation, acceleration, bag state (in or out of a bag), and/or lid sensor(s) (open or closed).

One or more of sensors 112 may be disposed within IHS 100, on a bezel of IHS 100 (e.g., a narrow of thin bezel), on display 110, or on a hinge coupling a display portion to a keyboard portion of IHS 100. As used herein, the term "bezel" refers to a monitor or display bezel which is an area of a display that surrounds the screen (e.g., an LCD panel or the like). Narrow bezels (e.g., 1-3 mm) help maximize the screen real estate of a laptop IHSs and/or can make multiple desktop displays look more like a single screen when arranged side-by-side.

In some cases, one or more of sensors 112 may be part of a keyboard or other input device. Processor 101 may be configured to process information received from sensors 112 through sensor hub 114, and to perform methods for prioritizing the pre-loading of applications with a constrained memory budget using contextual information obtained from sensors 112.

For instance, during operation of IHS 100, the user may open, close, flip, swivel, or rotate display 108 to produce different IHS postures. In some cases, processor 101 may be configured to determine a current posture of IHS 100 using sensors 112. For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For example, in a laptop posture, a first display surface of a first display 108 may be facing the user at an obtuse angle with respect to a second display surface of a second display 108 or a physical keyboard portion. In a tablet posture, a first display 108 may be at a straight angle with respect to a second display 108 or a physical keyboard portion. And, in a book posture, a first display 108 may have its back resting against the back of a second display 108 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

In other cases, processor 101 may process user presence data received by sensors 112 and may determine, for example, whether an IHS's end-user is present or absent. Moreover, in situations where the end-user is present before IHS 100, processor 101 may further determine a distance of the end-user from IHS 100 continuously or at pre-determined time intervals. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor 101 may receive and/or to produce system context information using sensors 112 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor 101, and it may communicate with chipset 103 via a bus connection such as an Inter-Integrated Circuit (VC) bus or other suitable type of bus connection. Sensor hub 114 may also utilize an I²C bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main processors 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as an SoC.

Figure 2:
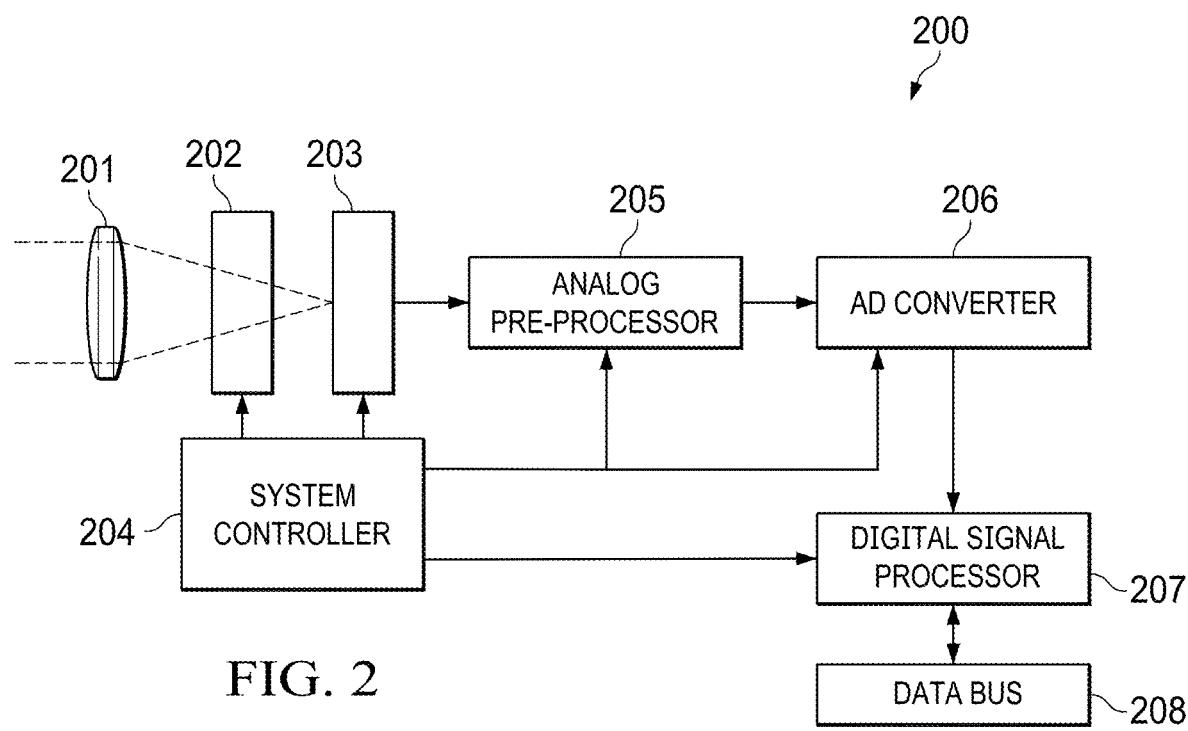
FIG. 2 is a block diagram an example of a camera system having an electro-optical shutter, according to some embodiments.

FIG. 2 is a block diagram an example of camera system 200 having electro-optical shutter 202. In some embodiments, camera system 200 may include optical lens 201, electro-optical shutter 202 optically coupled to optical lens 201, and image sensor 203 optically coupled to electro-optical shutter 202. Images captured by image sensor 203 are processed by analog pre-processor 205 before reaching Analog-to-Digital (AD) converter 206. Digital images produced by AD converter 206 are provided to digital signal processor (DSP) 207, and digitally processed images are then communicated via data bus 208 to other systems, such as, for example, processor 101.

System controller 204 may be electrically coupled to electro-optical shutter 202, image sensor 203, analog pre-processor 205, AD converter 206, and/or DSP 207, and it may be configured to execute program instructions to control any or all of elements 202-207. For example, in various implementations, system controller 204 may be configured to control transmissivity characteristics of electro-optical shutter 202 based upon context information, as described in more detail in connection with FIG. 6 below.

Figure 3:
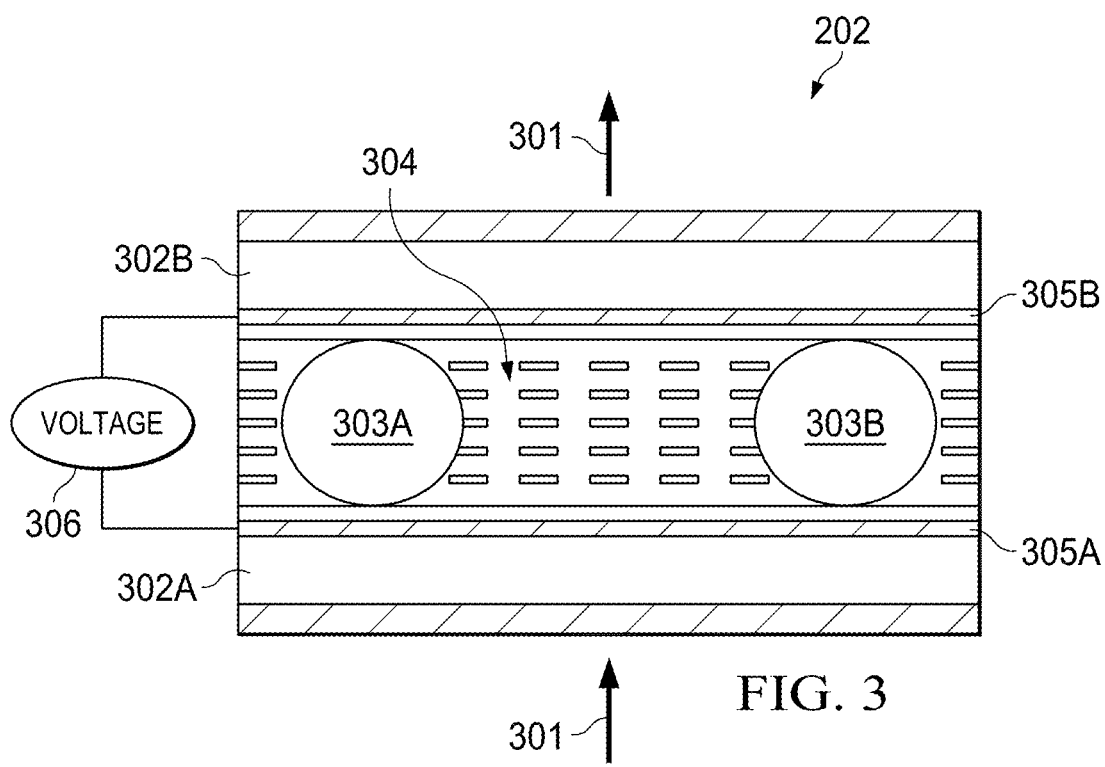
FIG. 3 is a sectional view of an example of an electro-optical shutter, according to some embodiments.

FIG. 3 is a sectional view of an example of electro-optical shutter 202. As illustrated, electro-optical shutter 202 includes first glass substrate 302A and second glass substrate 302B separated by spacers 303A and 303B. Photoelectric liquid crystal material 304 (e.g., ferroelectric, polymeric, nematic, or smectematic materials, etc.) is sandwiched between first substrate 302A and second substrate 302B. Voltage 306 may be applied to transparent electrodes 305A and 305 (e.g., as output by system controller 204) in order to control the operation of electro-optical shutter 202, including its transmissivity characteristics.

As used herein, the term "transmissivity" refers to an optical property of a material that describes how much light is transmitted through the material in relation to an amount of light incident on the material. In some cases, voltage 306 may be a voltage ladder or the like.

Figure 4A:
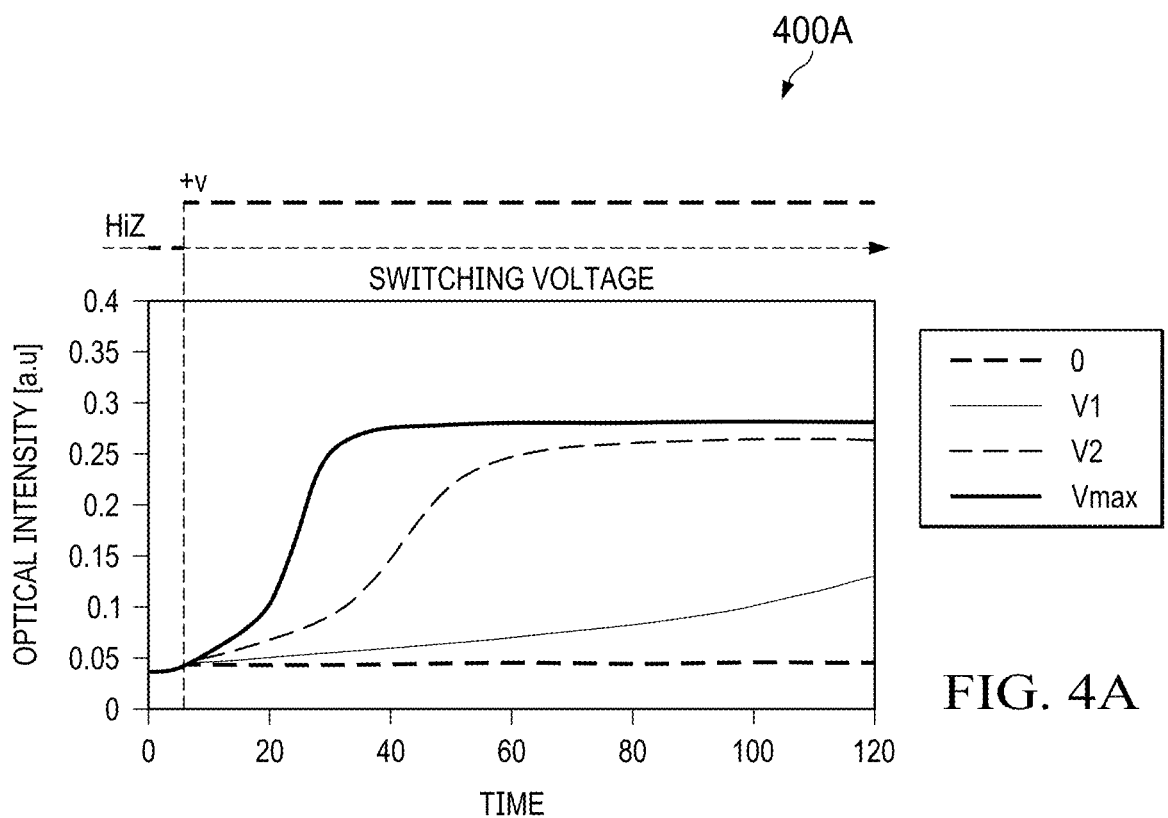
FIGS. 4A and 4B illustrate examples of an electro-optical shutter's transmissivity being controlled by different voltage values, according to some embodiments.
Figure 4B:
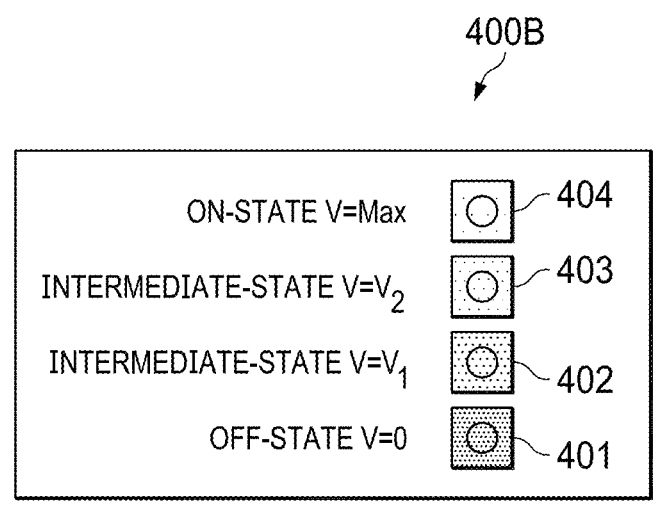

FIGS. 4A and 4B illustrate examples of an electro-optical shutter's transmissivity being controlled by different voltage values. Particularly, graph 400A in FIG. 4A shows different optical intensity curves, which indicate an electro-optical transmissivity characteristics of photoelectric liquid crystal material 304 when subject to different switching voltages 306 over time. Meanwhile, FIG. 4B shows off-state 401 (V=0), first intermediate state (V=V1), second intermediate state (V=V2), and on-state 404 (V=Vmax), each of states 401-404 produced by the application of a different voltage value 306.

Figure 5:
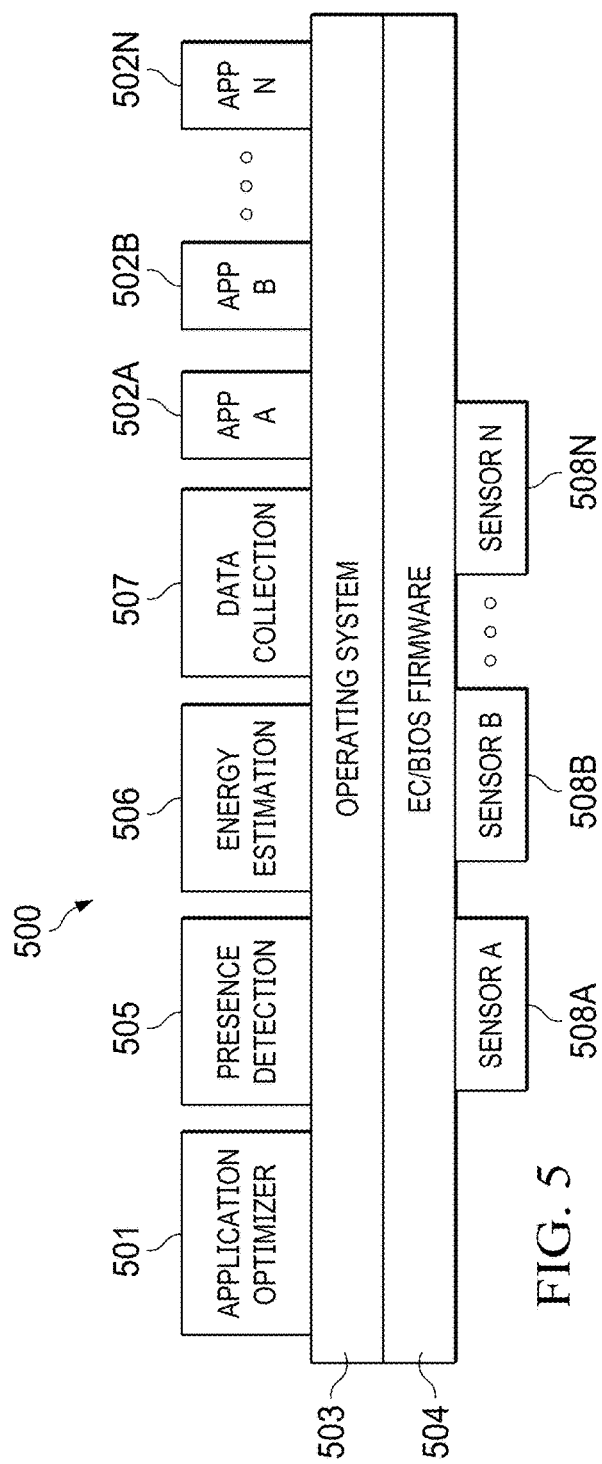
FIG. 5 is a block diagram illustrating an example of a software system configured to operate an electro-optical shutter with variable transmissivity, according to some embodiments.

FIG. 5 is a block diagram illustrating an example of software system 500 configured to operate an electro-optical shutter with variable transmissivity. In some embodiments, each element of software system 500 may be enabled by IHS 100 through the execution of program instructions by one or more logic components (e.g., CPU 100, BIOS 117, EC 120, etc.) stored in memory (e.g., system memory 105), storage device(s) 119, and/or firmware 117, 120.

As shown, software system 500 includes application optimizer engine 501 configured to manage the performance optimization of applications 502A-N. An example of application optimizer engine 501 is the DELL PRECISION OPTIMIZER Examples of applications 502A-N include, but are not limited to, computing resource-intensive applications such as remote conferencing applications, video editors, image editors, sound editors, video games, etc.; as well as less resource-intensive applications, such as media players, web browsers, document processors, email clients, etc.

Figure 6:
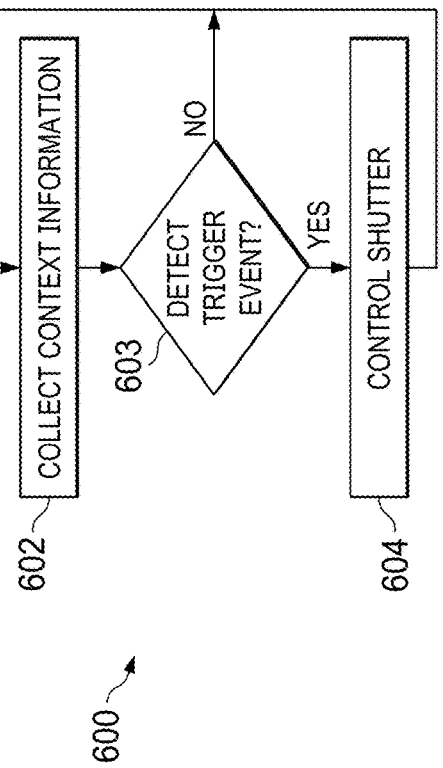
FIG. 6 is an example of a method for operating an electro-optical shutter with variable transmissivity, according to some embodiments.

In various embodiments, application optimizer engine 501 may implement method 600 for operating electro-optical shutter 202 with variable transmissivity described in FIG. 6. Both application optimizer engine 501 and applications 502A-N are executed by OS 503, which is in turn supported by EC/BIOS instructions/firmware 504. EC/BIOS firmware 504 is in communications with, and configured to receive data collected by, sensor modules or drivers 508A-N—which may abstract and/or interface with respective ones of sensors 112.

Software system 500 also includes presence detection module or application programming interface (API) 505, energy estimation engine or API 506, and data collection module or API 507 executed above OS 503.

Presence detection module 505 may process user presence data received by one or more of sensor modules 508A-N and it may determine, for example, whether an IHS's end-user is present or absent. Moreover, in cases where the end-user is present before the IHS, presence detection module 505 may further determine a distance of the end-user from the IHS continuously or at pre-determined time intervals. The detected or calculated distances may be used by presence detection module 505 to classify the user as being in the IHS's near-field, mid-field, or far-field.

Energy estimation engine 506 may include, for example, the MICROSOFT E3 engine, which is configured to provide energy usage data broken down by applications, services, tasks, and/or hardware in an IHS. In some cases, energy estimation engine 506 may use software and/or hardware sensors configured to determine, for example, whether any of applications 502A-N are being executed in the foreground or in the background (e.g., minimized, hidden, etc.) of the IHS's graphical user interface (GUI).

Data collection engine 507 may include any data collection service or process, such as, for example, the DELL DATA VAULT configured as a part of the DELL SUPPORT CENTER that collects information on system health, performance, and environment. In some cases, data collection engine 507 may receive and maintain a database or table that includes information related to IHS hardware utilization (e.g., by application, by thread, by hardware resource, etc.), power source (e.g., AC-plus-DC, AC-only, or DC-only), etc.

In operation, application optimizer engine 501 monitors applications 502A-N executing on IHS 100. Particularly, application optimizer engine 501 may gather data associated with the subset of I/O parameters for a predetermined period of time (e.g., 15, 30, 45, 60 minutes or the like). For each of applications 502A-N, a classifier may use the gathered data and context information to characterize the application's workload with various settings, memory usage, responsiveness, etc.

FIG. 6 is an example of method 600 for operating electro-optical shutter 202 with variable transmissivity. In some embodiments, method 600 may be performed, at least in part, by processor 101 and/or controller 204 in response to the execution of program instructions stored in a memory (e.g., system memory 105).

Particularly, method 600 begins at block 601. At block 602, method 600 collects context information. At block 605, method 600 may use the context information to determine whether a trigger event (e.g., the camera is turned on, a privacy setting is received or modified, a user's proximity is detected or modified, etc.) is detected. If not, control returns to block 602. Otherwise, at block 604, method 600 controls voltage 306 to change the transmissivity of electro-optical shutter 202 in response to the trigger event and to a value associated with the current context information. In various implementations, it is the transmissivity of electro-optical shutter 202's active or on-state (i.e., the transmissivity of the shutter in its "open" state) that is modified.

For example, when the context information of block 602 includes a privacy setting (e.g., a binary value, or a value between 1 and N, etc.), block 604 can increase the transmissivity of electro-optical shutter 202 in response to the privacy setting having a first value (indicative of "low" privacy), and (b) decrease the transmissivity of electro-optical shutter 202 in response to the privacy setting having a second value greater than the first value (indicative of "high" privacy).

In some cases, block 604 may increase the transmissivity of electro-optical shutter 202 until the IHS is capable of distinguishing visual features in an image captured by the camera (to create a low privacy environment), or it may decrease the transmissivity of electro-optical shutter 202 until the IHS is no longer capable of distinguishing the visual features but is still capable of identifying a user's presence or proximity to the IHS (to create a high privacy environment).

Additionally, or alternatively, when context information of block 602 includes a user's proximity to the IHS, block 604 may increase the transmissivity of electro-optical shutter 202 to a first value in response to a user being in a far-field of the IHS (e.g., a distance greater than 3 meters), and decrease the transmissivity of electro-optical shutter 202 to a second value in response to the user being in a near-field of the IHS (e.g., a distance smaller than 1 meter).

Other examples of context information collected in block 602 may include, but are not limited to: an identity of a user of the IHS, a time-of-day, a calendar event, a type of calendar event, an application currently under execution, a duration of execution of an application, a mode of execution of an application, or a user's gaze direction, a current location of the IHS, a current memory usage, a characteristic of a current network connection, a current power usage, an identification of a currently connected peripheral device, or a current IHS posture. In various embodiments, block 604 may implement any suitable rule associated with any suitable combination of context information to increase or decrease the transmissivity of electro-optical shutter 202.

In some cases, liquid crystal material 304 may be selected based upon a color of an IHS's bezel. For example, if the bezel is black, liquid crystal material 304 may include a ferroeletric material. In that case, when in an on-state, the shutter is transparent enabling the camera's operation. In an off-state, the shutter has a black color indicating camera blacking. The off-state is also in the closed position forcing user to activate the on-state to enable the camera, yet no no voltage activation required and there is no need to consume power.

Conversely, if the bezel is white, liquid crystal material 304 may include a polymeric material. In that case, when in an on-state, the shutter is transparent enabling the camera's operation. In an off-state, the shutter has a white color indicating camera blacking. The off-state is also in the closed position forcing user to activate the on-state to enable the camera, yet no voltage activation required and there is no need to consume power. Moreover, a voltage ladder can be used to enable different level of shutter transmissivity.

Moreover, if the bezel is of another color that is not black or white, liquid crystal material 304 may include nematic or smectmatic materials with a color dye to match the color of the bezel. In that case, when in an on-state, the shutter is opaque blocking the camera's operation. In the on-state, a voltage bias may be used to maintain that state, which requires some continuous power consumption. In the off-state, however, the shutter is transparent enabling the camera's operation. Moreover, a voltage ladder can be used to enable different shutter activation times.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution, cause the IHS to:
   receive context information;
   select a transmissivity value among more than two transmissivity values for an electro-optical shutter of a camera coupled to the IHS based, at least in part, upon the context information; and
   control a transmissivity of the electro-optical shutter of the camera based, at least in part, on the transmissivity value.

2. The IHS of claim 1, wherein the context information comprises a privacy setting, and wherein to select the transmissivity value for the electro-optical shutter, the program instructions, upon execution, cause the IHS to: (a) increase the transmissivity value in response to the privacy setting having a first value, and (b) decrease the transmissivity value in response to the privacy setting having a second value greater than the first value.

3. The IHS of claim 1, wherein to select the transmissivity value for the electro-optical shutter, the program instructions, upon execution, further cause the IHS to: (a) increase the transmissivity value until the IHS is capable of distinguishing visual features in an image captured by the camera, or (b) decrease the transmissivity value until the IHS is no longer capable of distinguishing the visual features but is capable of identifying a user's presence or proximity to the IHS.

4. The IHS of claim 1, wherein the context information comprises a user's proximity to the IHS, and wherein to select the transmissivity value for the electro-optical shutter, the program instructions, upon execution, cause the IHS to: (a) increase the transmissivity value to a first transmissivity value of the more than two transmissivity values in response to a user being in a far-field of the IHS, and (b) decrease the transmissivity value to a second transmissivity value of the more than two transmissivity values in response to the user being in a near-field of the IHS.

5. The IHS of claim 1, wherein the context information comprises at least one of: an identity of a user of the IHS, a time-of-day, a calendar event, a type of calendar event, an application currently under execution, a duration of execution of an application, a mode of execution of an application, or a user's gaze direction.

6. The IHS of claim 1, wherein the context information comprises at least one of: a current location of the IHS, a current memory usage, a characteristic of a current network connection, a current power usage, an identification of a currently connected peripheral device, or a current IHS posture.

7. The IHS of claim 1, wherein the electro-optical shutter is disposed on a bezel of a display coupled to the IHS.

8. The IHS of claim 1, wherein the electro-optical shutter comprises a liquid crystal material disposed between at least two glass substrates, each glass substrate having a respective transparent electrode coupled thereto, and wherein to control the transmissivity of the electro-optical shutter, the program instructions, upon execution, cause the IHS to control a voltage applied to the liquid crystal material via the transparent electrode.

9. The IHS of claim 8, wherein to control the voltage, the program instructions, upon execution, cause the IHS to apply a voltage ladder to the liquid crystal material.

10. The IHS of claim 8, wherein the liquid crystal material is selected based upon a color of the bezel.

11. The IHS of claim 8, wherein the liquid crystal material comprises at least one of: (a) a ferroelectrical material if the bezel is black, (b) a polymeric material if the bezel is white, or (c) a nematic or smectmatic material with color dye if the bezel is neither black nor white.

12. A memory storage device having program instructions stored thereon that, upon execution by one or more processors of an Information Handling System (IHS), cause the IHS to:
receive context information;
select a transmissivity value among more than two transmissivity values for an electro-optical shutter of a camera coupled to the IHS based, at least in part, upon the context information; and
control a transmissivity of the electro-optical shutter of the camera based, at least in part, on the transmissivity value.

13. The memory storage device of claim 12, wherein the context information comprises a privacy setting, and wherein to select the transmissivity value for the electro-optical shutter, the program instructions, upon execution, cause the IHS to: (a) increase the transmissivity value in response to the privacy setting having a first value, and (b) decrease the transmissivity value in response to the privacy setting having a second value greater than the first value.

14. The memory storage device of claim 12, wherein to select the transmissivity value for the electro-optical shutter, the program instructions, upon execution, further cause the IHS to: (a) increase the transmissivity value until the IHS is capable of distinguishing visual features in an image captured by the camera, or (b) decrease the transmissivity value until the IHS is no longer capable of distinguishing the visual features but is capable of identifying a user's presence or proximity to the IHS.

15. The memory storage device of claim 12, wherein the context information comprises a user's proximity to the IHS, and wherein to select the transmissivity value for the electro-optical shutter, the program instructions, upon execution, cause the IHS to: (a) increase the transmissivity value to a first transmissivity value of the more than two transmissivity values in response to a user being in a far-field of the IHS, and (b) decrease the transmissivity value to a second transmissivity value of the more than two transmissivity values in response to the user being in a near-field of the IHS.

16. The memory storage device of claim 12, wherein the context information comprises at least one of: an identity of a user of the IHS, a time-of-day, a calendar event, a type of calendar event, an application currently under execution, a duration of execution of an application, a mode of execution of an application, a user's gaze direction, a current location of the IHS, a current memory usage, a characteristic of a current network connection, a current power usage, an identification of a currently connected peripheral device, or a current IHS posture.

17. A method, comprising:
receiving context information;
selecting a transmissivity value among more than two transmissivity values for an electro-optical shutter of a camera coupled to an Information Handling System (IHS) based, at least in part, upon the context information; and
controlling a transmissivity of the electro-optical shutter of the camera based, at least in part, on the transmissivity value.

18. The method of claim 17, wherein the context information comprises a privacy setting, the method further comprising: (a) increasing the transmissivity value in response to the privacy setting having a first value, and (b) decreasing the transmissivity value in response to the privacy setting having a second value greater than the first value.

19. The method claim 17, further comprising: (a) increasing the transmissivity value until the IHS is capable of distinguishing visual features in an image captured by the camera, or (b) decreasing the transmissivity value until the IHS is no longer capable of distinguishing the visual features but is capable of identifying a user's presence or proximity to the IHS.

20. The method of claim 17, wherein the context information comprises a user's proximity to the IHS, the method further comprising: (a) increasing the transmissivity value to a first transmissivity value of the more than two transmissivity values in response to a user being in a far-field of the IHS, and (b) decreasing the transmissivity value to a second transmissivity value of the more than two transmissivity values in response to the user being in a near-field of the IHS.

* * * * *